United States Patent [19]

Miner

[11] Patent Number: 4,870,714
[45] Date of Patent: Oct. 3, 1989

[54] PORTABLE BLOWER/VACUUM SYSTEM

[75] Inventor: Johnathan L. Miner, Timonium, Md.

[73] Assignee: Black & Decker Inc., Newark, Del.

[21] Appl. No.: 118,073

[22] Filed: Nov. 9, 1987

[51] Int. Cl.$^4$ ............................................... A47L 5/00
[52] U.S. Cl. ................................. 15/327 C; 15/344; 15/347; 15/414; 15/415 R
[58] Field of Search ............ 15/405, 344, 347, 327 C, 15/330, 414, 415 R, 338

[56] References Cited

U.S. PATENT DOCUMENTS

| | | | |
|---|---|---|---|
| 1,072,549 | 9/1913 | Williams . | |
| 1,140,992 | 5/1915 | Martin | 15/338 X |
| 1,330,547 | 2/1920 | Mehlhaf . | |
| 1,815,242 | 7/1931 | Davidson . | |
| 2,068,496 | 1/1937 | Linghammar | 15/415 X |
| 2,073,489 | 3/1937 | Leathers | 183/36 |
| 2,294,135 | 8/1942 | Smith | 103/115 |
| 2,847,156 | 8/1958 | Bleier | 230/117 |
| 3,230,696 | 1/1966 | Liljenberg | 56/202 |
| 3,386,234 | 6/1968 | Leader | 56/202 |
| 3,421,302 | 1/1969 | Dahl | 56/202 |
| 3,813,725 | 6/1974 | Rinker | 15/347 |
| 3,862,469 | 1/1975 | Burgoon | 15/357 |
| 3,978,547 | 9/1976 | Lawson | 15/345 |
| 4,227,280 | 10/1980 | Comer | 15/330 |
| 4,290,165 | 9/1981 | Hiramatsu et al. | 15/330 |
| 4,325,163 | 4/1982 | Mattson et al. | 15/330 |
| 4,385,866 | 5/1983 | Ochiai et al. | 416/241 B |
| 4,553,284 | 11/1985 | Strumbos | 15/414 |
| 4,615,069 | 10/1986 | Henning | 15/405 X |
| 4,644,606 | 2/1987 | Luerken et al. | 15/330 |
| 4,674,146 | 6/1987 | Tuggle et al. | 15/405 X |
| 4,694,528 | 9/1987 | Comer et al. | 15/405 X |

FOREIGN PATENT DOCUMENTS

| | | |
|---|---|---|
| 0198654 | 10/1986 | European Pat. Off. . |
| 0208320 | 1/1987 | European Pat. Off. . |
| 394225 | 6/1933 | United Kingdom . |
| 419191 | 11/1934 | United Kingdom . |
| 452111 | 8/1936 | United Kingdom . |
| 673669 | 6/1952 | United Kingdom . |
| 1032229 | 6/1966 | United Kingdom . |
| 1062797 | 3/1967 | United Kingdom . |
| 2138280 | 10/1986 | United Kingdom . |

OTHER PUBLICATIONS

Document A–"Examiner's Report to the Comptroller" for UK 8824 745.7 (Nov. 21, 1988).
Advertisement in "The Hardware Fair" 9/82—Electric Power Blower.

Primary Examiner—Chris K. Moore
Attorney, Agent, or Firm—Charles E. Yocum; Dennis A. Dearing; Edward D. Murphy

[57] ABSTRACT

A blower/vacuum system includes a power unit with a rotatably mounted fan for inducing an air flow from an inlet to an outlet. In the vacuum configuration, a pick-up tube having a relatively wide inlet opening is connected to the inlet of the power unit to direct the debris into the fan housing. The fan includes widely spaced fan blades that are sufficiently wide to accept and pass the expected range of non-frangible debris, including pine cones, seed pods, gum balls, and the like. The debris is passed through the fan housing to the outlet and to a dual-porosity collection bag having front, top, bottom, and side portions fabricated from a fabric having a first air flow porosity and a rear portion fabricated from an another fabric having a second air flow porosity that is higher than the first air flow porosity so that the entire fabric surface will function to exhaust the air flow with the major portion of the air flow flowing through the rear portion to direct the exhaust air and any dust and other particles away from the user. In the blower configuration, a discharge tube is connected to the outlet to discharge the exhaust air through the end of the discharge tube.

17 Claims, 8 Drawing Sheets

PORTABLE BLOWER/VACUUM SYSTEM

BACKGROUND OF THE INVENTION

The present invention relates to an improved blower/vacuum system used for vacuuming or blowing debris, such as leaves and grass clippings, from a lawn or other ground surface and, more particularly, to a blower/vacuum system having improved performance characteristics compared to prior systems.

Various types of portable blower/vacuum systems have been developed for removing leaves and other debris, including twigs, pine cones, seed pods, grass clippings, and the like, from the surface of lawns, patios and the like. A typical system includes a housing with a fan that is driven by an electrical or internal combustion engine and which develops an air flow from an inlet to an outlet. A pick-up tube is connected to the inlet with the air flow entraining and carrying the debris to an outlet for collection in a debris-collection bag. In order to convert the system to a blower, the pick-up tube is replaced by an inlet shield and the debris-collection bag is replaced by an air discharge tube with the air flow used to blow the debris to a selected location.

Various design tradeoffs must be considered in the design of a blower/vacuum system. In general, the overall design must provide a light-weight and relatively compact apparatus to allow the operator to conveniently carry and manipulate the system during use. The system must be sufficiently powerful to pick-up the full range of debris including large wet leaves, pine cones, seed pods, twigs, and compacted grass clippings. Since increasing the power of the fan unit usually involves a larger diameter fan, a correspondingly larger fan housing and a motor are required to house and drive the fan. Thus, a balance is required between the need to provide an apparatus having a size and weight consistent with portability and sufficient power to accomplish the debris collection task.

One problem associated with existing blower/vacuum systems is the handling of larger non-frangible debris, such as pine cones, Sweetgum gum balls, and seed pods, that are too large to pass through the fan housing to the outlet. This type of debris oftentimes accumulates at the inlet to the fan housing and must be removed by turning the motor off to interrupt the air flow and allowing the debris to fall through the pick-up tube to the ground. In addition to the problem of over-sized debris, it is common for large leaves to 'bridge' the inlet opening of the pick-up tube and prevent further operation. The typical debris-collecting bag is formed from a woven fabric that easily captures the debris but allows the air and dust particles to exhaust through the fabric and generally exhausts the air uniformly through its entire surface area.

SUMMARY OF THE INVENTION

In view of the above, it is an object of the present invention, among others, to provide a blower/vacuum system that is both lightweight and convenient to use and which functions in an efficient manner in either a vacuum or blower configuration.

It is another object of the present invention to provide a blower/vacuum system that is capable of collecting large, non-frangible debris such as pine cones, gum balls, seed pods, and the like.

It is still another object of the present invention to provide a blower/vacuum system in which large leaves can be picked-up without bridging the inlet opening.

It is still another object of the present invention to provide a blower/vacuum system in which the debris-collection bag effectively captures the collected debris while directing the major portion of the exhaust air flow, and any entrained particles, away from the user.

It is still a further object of the present invention to provide a blower/vacuum system having a high fan efficiency to provide a powerful and light weight system well-suited for its intended use.

In view of these objects, and others, the present invention provides a blower/vacuum system having a power unit with a rotatably mounted fan for inducing an air flow from an inlet to an outlet. In the vacuum configuration, a pick-up tube having a relatively wide inlet opening is connected to the inlet of the power unit to direct the debris into the fan housing. The fan includes widely spaced fan blades that are sufficiently wide to accept and pass the expected range of non-frangible debris, including pine cones, seed pods, gum balls and the like. The debris is passed through the fan housing to the outlet and to a dual-porosity collection bag having front, top, bottom, and side panels fabricated from a fabric having a first air flow porosity and a rear panel fabricated from another fabric having a second air flow porosity that is much higher than th first air flow porosity so that the entire fabric surface will function to exhaust the air flow to the environment with the major portion of the air flow preferentially exhausted through the rear panel to direct any entrained dust and other particulate matter away from the user. In the blower system, the pick-up tube is replaced by an inlet shield and the debris-collection bag is replaced by an air discharge tube to discharge the exhaust air through the end of the discharge tube.

The pick-up tube is provided with a larger diameter at its lower end to accept the full range of debris while minimizing the probability of 'bridging' and carries the debris to a smaller diameter upper end for presentation to a fan having a somewhat larger diameter to provide a highly efficient air flow from the pick-up tube to the collection bag in which the spacing between the blades of the fan is sufficiently large to accept the expected size range of debris.

The present invention advantageously provides a combined blower/vacuum system which provides a compact power unit that can accept and pass the full range of debris from the pick-up tube to the debris-collection bag and which directs the major portion of the exhaust air, including entrained dust particles, away from the user.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
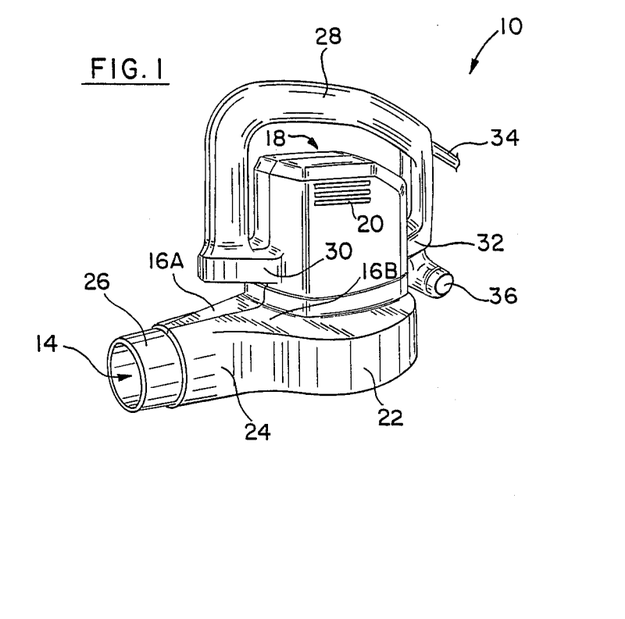
FIG. 1 is a perspective view of a power unit portion of the blower/vacuum system of the present invention.
Figure 2:
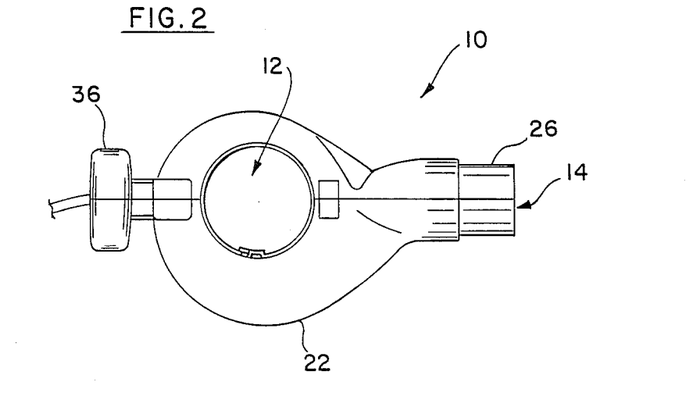
FIG. 2 is a bottom view of the power unit of FIG. 1.
Figure 3:
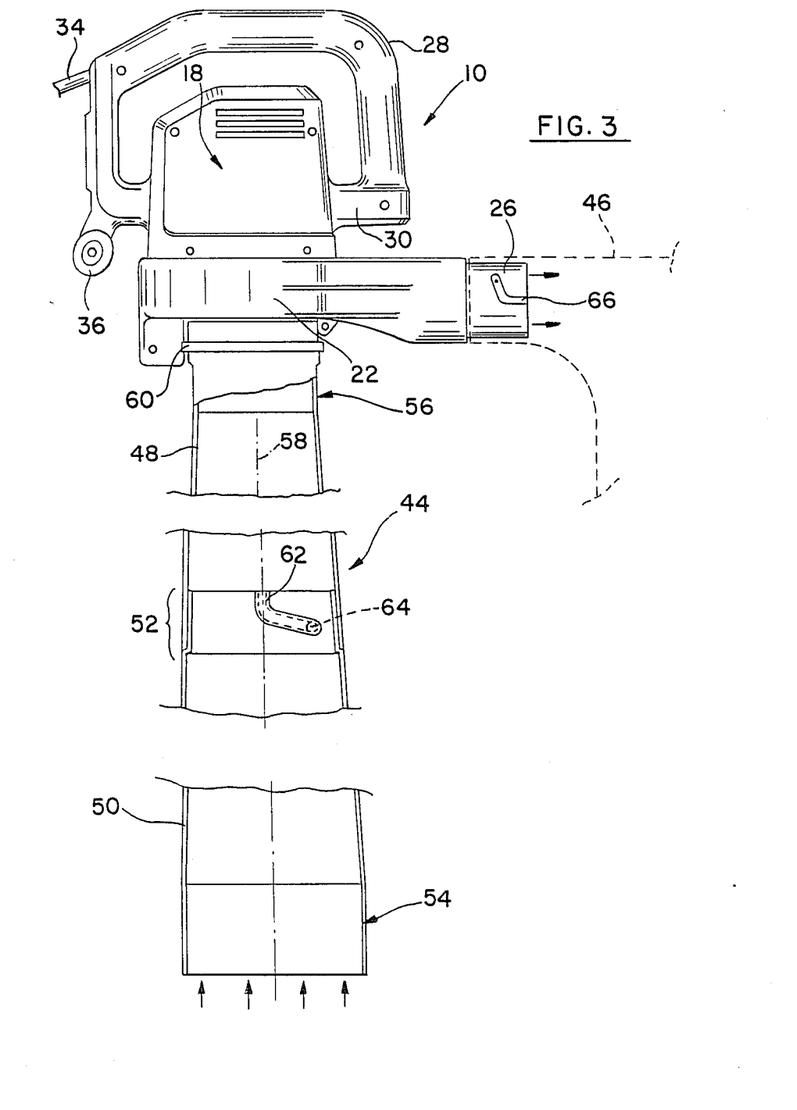
FIG. 3 is a side elevational view of the power unit in its vacuum configuration and showing a pick-up tube connected to the bottom of the power unit and a debris-collecting bag attached to an outlet with selected portions of the pick-up tube shown in fragmented form and the debris-collecting bag partially shown in dotted line illustration.

A blower/vacuum system in accordance with the present invention includes, as shown in FIGS. 1–3, a power unit 10 that contains an internal fan and drive motor, as explained below, an air inlet 12 on the underside of the power unit (FIG. 2), and an air outlet 14. The power unit 10 accepts various attachments to provide a debris-collecting vacuum function or a blower function and includes a housing 16 defined by complementary halves 16A and 16B that are molded from a suitable plastic and assembled together to form a complete structure. The housing 16 includes a motor section 18 which includes cooling air inlet vents 20, a fan scroll 22 located beneath the motor section 18, and discharge air transition section 24 between the fan scroll 22 and an outlet fitting 26.

Figure 5:
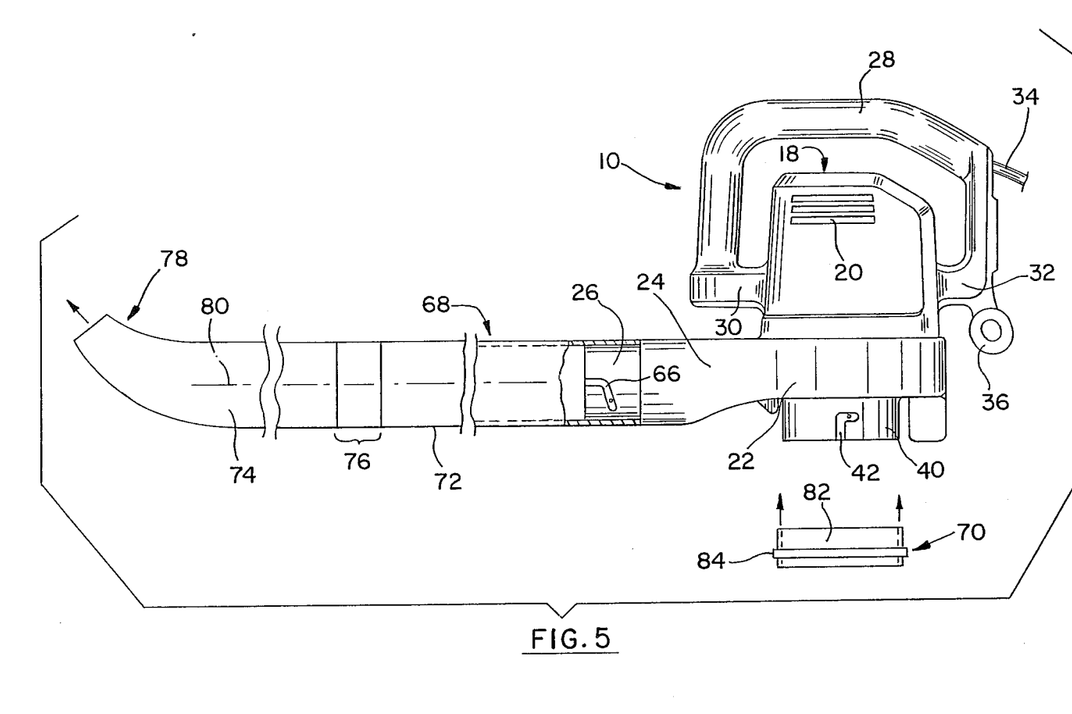
FIG. 5 is a side elevational view of the power unit in its blower configuration with a discharge tube attached to the outlet.
Figure 10:
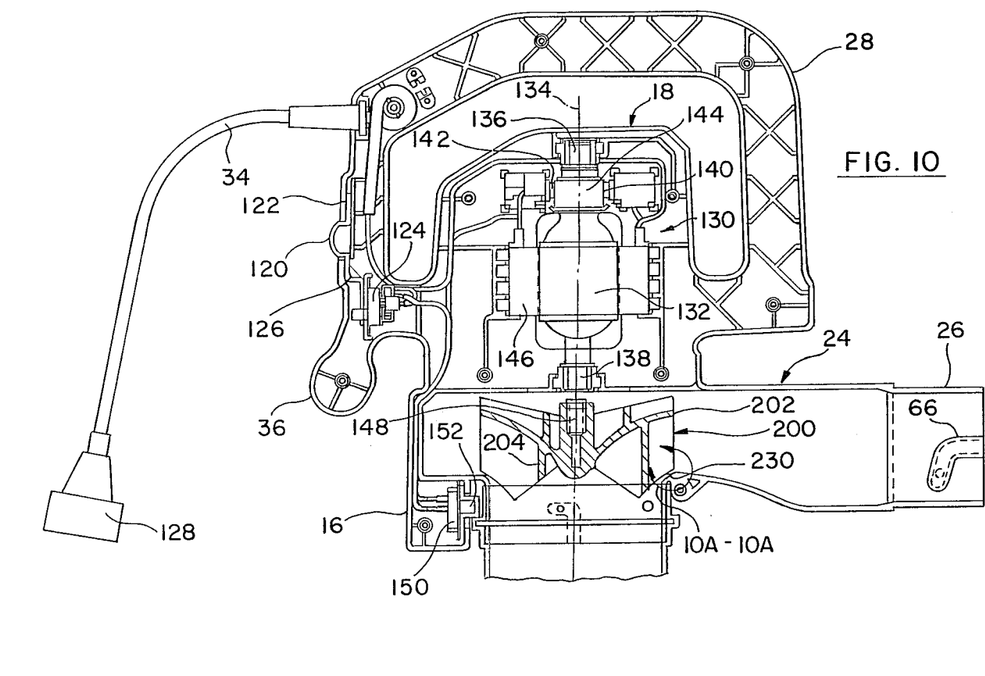
FIG. 10 is a side cross-sectional view, taken along a medial line, of the power unit.

A first handle 28, in the general form of an inverted "C", is attached to one side of the motor section 18 through a transition section 30 and at the opposite side of the motor housing 18 through another transition section 32 with a power cord 34 extending outwardly of the handle 28 as shown. The grippable portions of the handle 28 are spaced from the exterior of the motor housing 18 to allow convenient grasping of the handle 28 in a variety of positions by the user. A second handle 36 is attached to and depends from the first handle 28 on the side opposite the air outlet 14. The two handles 28 and 36 are used to hold and manipulate the power unit 10 and its below-described attachments when the power unit 10 is configured as a vacuum unit. A user-operable multi-position switch, described more fully below in relationship to FIG. 10, is mounted in the handle 28 below the power cord 34 and above the second handle 36. As shown in FIG. 5, a cylindrical inlet fitting 40 surrounds and depends from the air inlet 12 and includes at least two grooves 42 (only one of which is illustrated) that extend axially upward and circumferentially from the lower edge of the inlet fitting 40. As explained below, the grooves 42 assist in effecting a connection with various attachments.

The power unit 10 is configured as a vacuum unit, as shown in FIG. 3, by connecting a pick-up tube 44 to the inlet fitting 40 (FIG. 5) and a debris-collection bag 46 (shown in partial dotted line illustration in FIG. 3) to the air outlet fitting 26. The pick-up tube 44, which is shown in cross-section in FIG. 4, includes an upper section 48 and a lower section 50 joined together at a coupling 52. The pick-up tube 44 is preferably molded from a strong, resilient plastic and includes a lower cylindrical section 54 at its lower end and another cylindrical section 56 at its upper end and is defined as a conical sleeve or tube about an axis 58 between the lower and upper cylindrical sections 54 and 56. The debris entrance opening defined by the cylindrical section 54 is transversely aligned relative to the axis 58. The pick-up tube 44 has a top to bottom dimension of about 30 inches (76 cm.), a preferred inside diameter of about six inches (150 mm.) at its lower end and a diameter dimension of about 4.25 inches (108 mm.) at its upper end with a gradually converging taper of about 2–3 degrees relative to the axis 58 in the direction of the upper cylindrical section 56.

Figure 4:
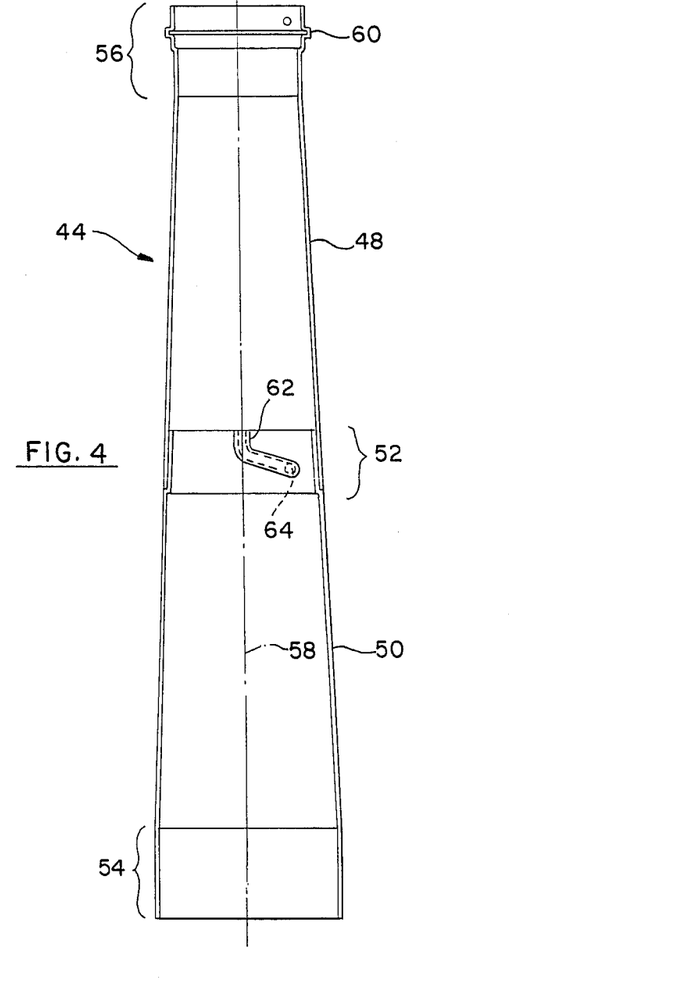
FIG. 4 is an elevational view, in cross section, of the pick-up tube of FIG. 3.

The use of a pick-up tube 44 having a large, circular debris entrance opening transverse to the axis 58, as defined by the lower cylindrical section 54, relative to the upper end allows for the design of a power unit 10 in which a reasonably sized motor and fan unit can be retained while providing a debris entrance opening that is too large to allow 'bridging' by leaves and twigs and thus avoids a problem commonly associated with prior systems of this type. In addition, the large circular opening at the lower end of the pick-up tube 44 allows the pick-up tube 44 to be held at an angle relative the ground surface so that a substantial air flow can be induced immediately above the debris to assist in entraining the debris and aspirating it into the pick-up tube 44.

The upper cylindrical section 56 of the pick-up tube 44 is designed to slip over and engage the inlet fitting 40 of the power unit 10 with appropriate projections (not shown) entering the respective grooves 42 (FIG. 5) to form a twist-type 'bayonet' connection between the pick-up tube 44 and the power unit 10. An annular outwardly extending flange 60 is formed about the periphery of the upper cylindrical section 56 adjacent the upper end and is designed to engage a safety switch (not shown in FIG. 4) as described in more detail below with regard to FIG. 10. The coupling 52 joining the upper and lower sections, 48 and 50, of the pick-up tube 44 is defined by inner and outer sections, as best shown in FIG. 4, with grooves 62 (only one of which is shown) and cooperating projections 64 interengaging to provide a twist-type 'bayonet' coupling 52.

In its vacuum configuration, an air flow is established by operation of the fan (as described below in relationship to FIG. 10) with the air and entrained debris entering the desirably large debris-entrance opening at the bottom of the pick-up tube 44 and transported upwardly to the smaller diameter air inlet 12 where the debris enters the fan scroll 22 and is exhausted through the outlet fitting 26 into the debris-collection bag 46 (shown in partial dotted line in FIG. 3). Since the pick-up tube 44 tapers to a smaller diameter at is upper end, the velocity of the air flow and any entrained materials increases along the tube length to the power unit 10 to insure successful entry of the debris into the fan scroll 22 and passage into the debris-collection bag 46. The increased velocity also prevents the undesired build-up of debris at the entry opening of the air inlet 12. As shown on the right in FIG. 3, the outlet fitting 26 includes a groove 66 to form a twist-type 'bayonet' connection with the debris-collection bag 46.

In order to configure the power unit 10 as a blower and as shown in FIG. 5, the pick-up tube 44 and the debris-collection bag 46 are removed from their inlet and outlet fittings 40 and 26, respectively, and an air discharge tube 68 is connected to the outlet fitting 26 and an air inlet shield 70 connected to the air inlet 12. The air-discharge tube 68 is formed from a first section 72 and a second section 74 joined at a coupling 76 that is similar in structure to the coupling 52 of the pick-up tube 44. The remote end of the air-discharge tube 68 is formed as a constriction nozzle, as indicated generally at 78, at an angle relative to the long axis 80 of the air-discharge tube 68. The constriction nozzle 78 at the exit end of the air-discharge tube 68 desirably increases the air velocity and the distribution pattern of the discharged air. The air inlet shield 70 is formed as a short, cylindrical section 82 that fits over and engages the air inlet 12 in a manner consistent with that of the above described pick-up tube 44 and includes an annular outwardly extending flange 84 that is designed to engage a safety switch (not shown in FIG. 4) as described in more detail below with regard to FIG. 10. A screen (not shown) is formed in or across the open end of the air inlet shield 70.

Figures 6, 7, 8:
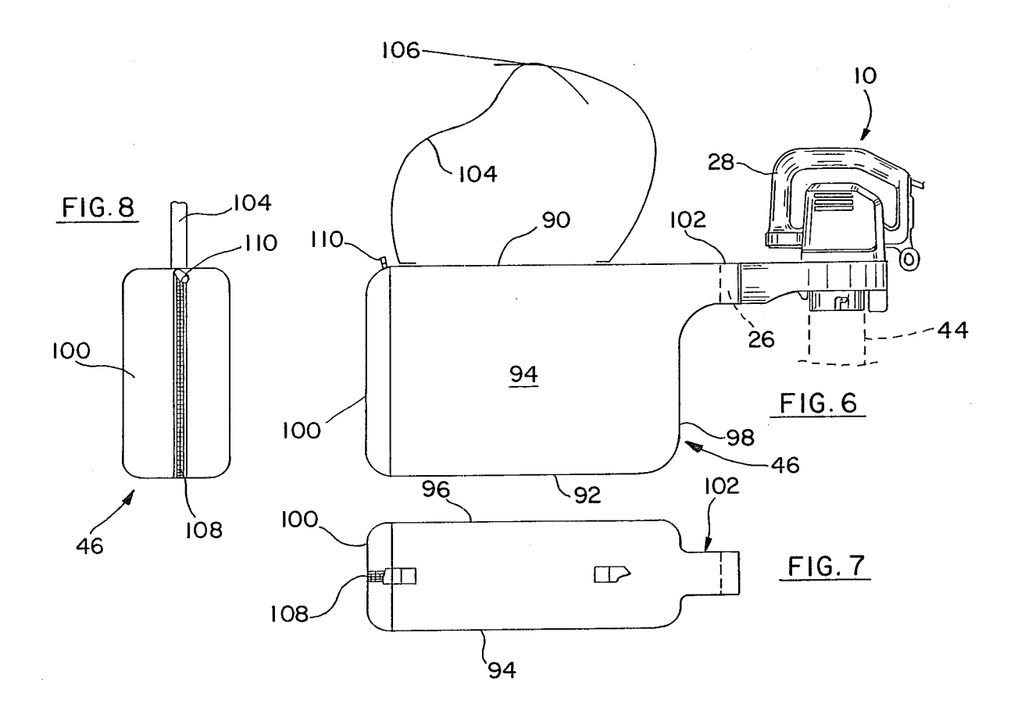
FIG. 6 is a side elevational view of an exemplary dual-porosity debris-collecting bag attached to the outlet of the power unit.
FIG. 7 is a top view of the debris-collecting bag of FIG. 6.
FIG. 8 is a rear elevational view of the debris-collecting bag of FIGS. 7 and 8.

The debris-collection bag 46, as shown in FIGS. 6–8, is designed for attachment to the air outlet 26 to capture the debris entrained in the air flow while allowing the air to exhaust to the environment. As shown, the debris-collection bag 46 includes top and bottom portions 90 and 92, side portions 94 and 96, a front portion 98, and a rear portion 100. The upper end of the front portion 98 converges to a neck 102 that fits over the outlet fitting 26. The end portion of the neck 102 is preferably stiffened or reinforced, for example, with a plastic insert (not shown) to form a cuff that fits over the air outlet 26. A loop-type carrier strap 104 is attached at its opposite ends to the top portion 90 of the debris-collection bag 46 and includes an adjustable clip 106 to allow the user to adjust the length of the strap 104. As best shown in FIG. 8, the debris-collection bag 46 is divided into left and right sections by a zipper 108 that is opened and closed by a zipper pull 110. The debris-collection bag 46 is normally suspended from the carrier strap 104 from the user's shoulder, such as the right shoulder, with the right hand gripping the handle 28 and the left hand gripping the handle 36. When carried in this manner, the lower end of the pick-up tube 44 can be conveniently guided by the operator.

Figure 9:
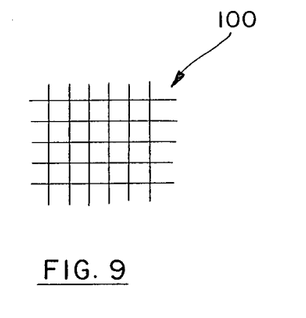
FIG. 9 is a representative view of the weave of a high-porosity fabric suitable for use with the dual-porosity bag of FIGS. 6–8.
Figures 9A, 10A:
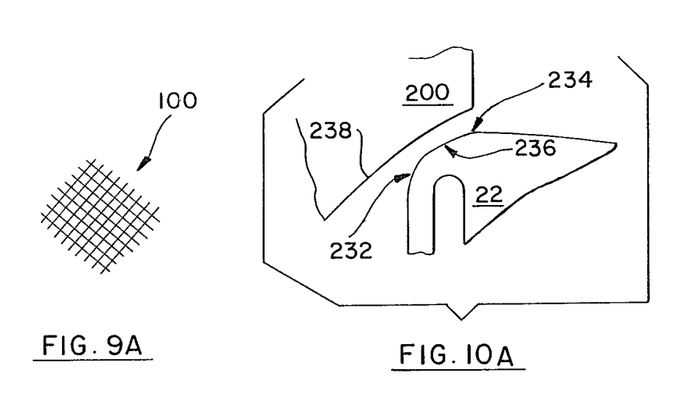
FIG. 9A is a representative view of the weave pattern of another high-porosity fabric suitable for use with the dual-porosity bag of FIGS. 6–8.
FIG. 10A is an enlarged detail of a transition surface taken along line 10A—10A of FIG. 10.

While the debris-collection bag 46 has been described as having discrete portions, as can be appreciated by those skilled in the art, the debris-collection bag 46 can be fabricated from fabric sections that are sewn or otherwise attached to form a bag having the general configuration as that shown in FIGS. 6–8. The debris-collection bag 46 is fabricated from fabrics having two different air flow porosities so that the major portion of the exhausted air, and any entrained dust particles, is directed away from the user. More specifically, the top and bottom portions 90 and 92, the side portions 94 and 96, and the front portion 98 are fabricated from a first fabric and the rear portion 100 is fabricated from a second fabric having a much higher porosity and air flow characteristics than the first fabric. In the preferred embodiment, the first fabric is an 8 oz per square yard 100% polyester fabric having a bonded acrylic foam coating. The second fabric is a 7.5 oz per square yard 100% polyester cloth with a 27.5×23 thread count, this latter fabric having a porosity at least one and one-half, two, or three times greater than that of the first fabric and results in a readily discernible relative increase in the air flow through the rear portion 100 relative the other portions of the debris-collection bag 46. As shown in the exemplary views of FIGS. 9 and 9A, the thread pattern of the second fabric defines an open-weave with rectangular or rhomboidal openings, respectively. The porosity of the second fabric can be increased by providing a successively larger open-weave, provided the debris collection function is not impaired. The use of two different fabrics provides for the manufacture of a dual-porosity debris-collection bag 46 in which the entire surface area of the bag serves to capture the entrained debris and exhaust the discharged air to the environment with the higher porosity rear portion 100 directing the major portion of the air rearwardly away from the user. In this way, the air flow is effectively exhausted to the environment while small entrained dust particles are directed away from the user to minimize operator discomfort.

The internal organization of the power unit 10 is shown in FIG. 10, and, as shown, the interior of the molded handle 28 is formed with a plurality of 'X'-shaped reinforcing partitions (unnumbered) to provide a measure of structural rigidity. A user-operable actuator 120 is slidably mounted in the handle 28 above the second handle 36 for limited movement in the up and down direction within the constraints of a cut-out 122. A slide-type multi-position ON/OFF and speed control switch 124 is mounted internally within the handle 28 and is coupled to the actuator 120 by a connecting member 126. The switch 124 is connected in circuit with the power cord 34 to receive electrical power through a connector 128.

An electric motor, generally indicated at 130, is mounted in the motor section 18 and includes a rotatably mounted armature 132 that is mounted for rotation about an axis 134 in bearings 136 and 138. Brushes 140 and 142 establish contact with a commutator 144 and are in circuit with a stator 146. A drive shaft 148 extends downwardly of the armature 132 and engages a fan wheel, indicated generally at 200, to rotate the fan wheel 200 about the axis 134, as described below. The motor 130 is operated in response to actuation of the switch 124 which supplies and interrupts electrical power to the motor 130 and is used to select the operating speed.

A normally off switch 150 is mounted in a portion of the housing 16 adjacent the inlet fitting 40 and presents an actuatable slide 152 that is engaged by the annular rim 60 on the pick-up tube 44 (FIG. 4) or the annular rim 84 on the air inlet shield 70 (FIG. 5). The switch 150 is in circuit with the motor 130 and the ON/OFF switch 124 to prevent operation of the motor 130 unless the pick-up tube 44 or the air inlet shield 70 is in place.

Figure 11:
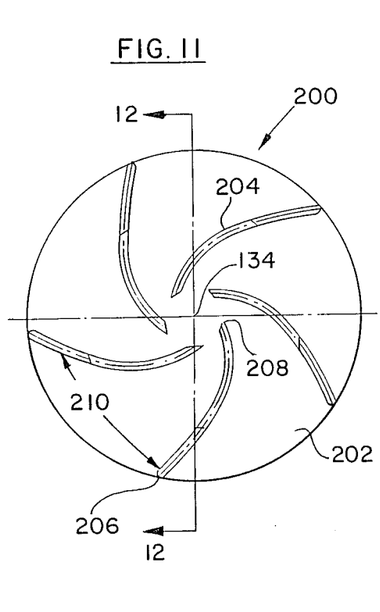
FIG. 11 is a front view of the fan wheel of the power unit.
Figure 12:
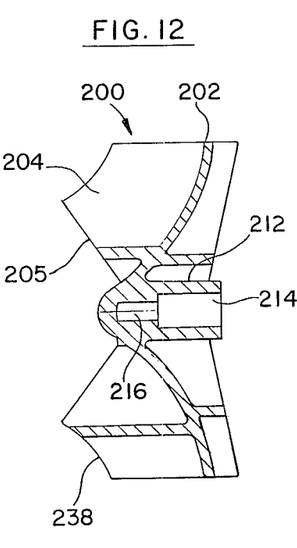
FIG. 12 is a cross-sectional view, taken along line 12—12 of FIG. 11, of the fan wheel of the power unit.
Figure 13:
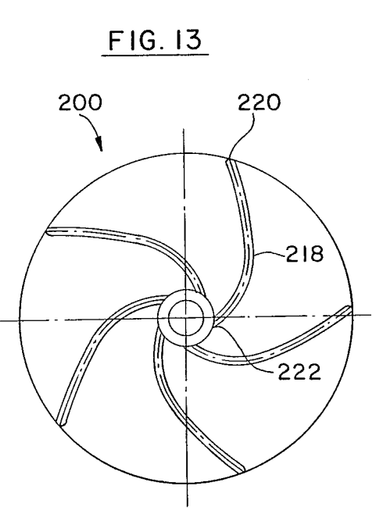
FIG. 13 is a rear view of the fan wheel of the power unit.

As shown in FIGS. 11, 12, and 13, the fan wheel 200 includes a partition 202 that divides the fan wheel 200 into a downwardly facing side, as shown in FIG. 11, and an upwardly facing side, as shown in FIG. 13. As shown in FIG. 11, a plurality of five air foils or blades 204 are formed on the partition 202 with each blade 204 extending in a curvilinear manner between an outer end 206 at the periphery of the fan wheel 200 and an inner end 208 adjacent the rotational axis 134. The various blades of the fan wheel 200 are provided with a sloping lower edge 205 that slopes inwardly and upwardly (in the context of FIG. 10) toward the inner portion of the fan wheel 200. In the preferred embodiment, the edges 205 are formed at a half-angle relative to its axis of rotation of between 40 and 55 degrees. Each of the sloping edges 205 represents a generatrix that describes a conical surface of revolution about the axis of revolution with the base of the cone facing the top of the pick-up tube 44, this conical surface being concave from the perspective the pick-up tube 44. The fan wheel 200 has a preferred outside diameter of about 4.5 inches (114 mm.) and the use of five blades 204 allows the blades 204 to be spaced by a spacing 210 which varies from a relatively larger spacing adjacent the periphery of the fan wheel 200 to a smaller spacing adjacent the interior of the fan wheel 200. The spacing 210 is such that the expected range of non-frangible debris, such as pine cones, gum balls, and seed pods, will be accepted into the conical surface of revolution defined by the edges 205 and pass between the blades 204 and expelled through the air discharge transition 24. The configuration of the fan wheel 200, in contrast to prior designs, is well adapted to the successful collecting of the full range of expected debris sizes.

The upper side of the fan wheel 200, as shown in FIG. 13, includes a centrally aligned mounting boss 212 having interior bores 214 and 216 which receive the lower end of the drive shaft 148. A plurality of air foils 218 are mounted on the upper side of the partition 202 and extend from a peripheral end 220 to an interior end 222 that joins with the mounting boss 212. The air foils 218 serve to draw cooling air through the cooling air vents 20 in the motor section 18 (FIG. 1) to cool the motor 130 and exhaust the air through the air discharge transition 24 to the outlet fitting 26.

As best seen in FIG. 10, the fan wheel 200 is positioned in the fan scroll 22 directly above the air inlet 12 with the air inlet dimensioned to be smaller in diameter that the overall diameter of the fan wheel 200. In the preferred embodiment, the fan wheel 200 has an outside dimension of 4.5 inches (114 mm.) and the air inlet 12 has an effective inside diameter of about four inches (100 mm.) to provide a configuration in which the fan wheel 200 is desirably larger than the air inlet 12.

A transition surface 23 is provided between the upper portion of the cylindrical inlet fitting 40 and the fan scroll 22 to seal the fan wheel 200 relative to the fan scroll 22. The transition surface 230 can be linear when viewed in transverse cross-section to provide an upwardly and outwardly tapered conical transition surface, or the transition surface 230 can be curvilinear when viewed in transverse cross-section to provide a transition surface 230 having an upwardly curved appearance. As shown in the enlarged detail of FIG. 10A, the preferred transition surface 230 is a compound surface defined by a curvilinear profile 232 adjacent the interior wall surface of the inlet fitting 40, another curvilinear surface 234 merging with the lower wall surface of the fan scroll 22, and a linear portion 236 intermediate the two curvilinear surfaces 232 and 236. As shown in FIG. 10, the blades 204 have a lower edge 238 that follow a curvilinear path in the area opposite the transition surface 230 to effectively seal the fan wheel 200 relative to the fan scroll 22 and minimize any tendency toward blow back. In the preferred embodiment, the fan wheel 200 is molded as a unitary structure from a strong resilient plastic.

The provision of a fan wheel 200 having a diameter larger than that of the air inlet 14 allows for effective 'sealing' between input and output sides of the fan wheel 200 and increased air flow efficiency. In contrast, a fan wheel having a diameter less than or equal to that of its associated air inlet decreases overall performance. The conical surface of revolution defined by the sloping edges 205 readily accepts the aspirated debris and prevents 'bird nesting' at the entry way of the fan wheel 200 as occurs in the prior art. Since the fan wheel 200 uses a relatively low number of blades 204 which beneficially provides a relatively large inter-blade space, the full range of expected debris can be efficiently aspirated by the fan wheel 200 while retaining the benefits of the sealed relationship between the large diameter fan and its smaller air inlet opening.

The present invention advantageously provides a combined blower/vacuum system which provides a compact power unit that can efficiently accept and pass the full range of debris from the pick-up tube to the debris-collection bag and which directs the major portion of the exhaust air, including entrained dust particles, away from the user.

Thus it will be appreciated from the above that as a result of the present invention, a portable blower/vacuum system is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A vacuum system comprising:
    a motor-fan unit having a fan rotatably mounted in a fan scroll for drawing air from an inlet and for exhausting the air to an outlet;
    an inlet tube having a first opening at one end and another opening at the other, said first opening being larger in diameter than said other opening and in a plane substantially perpendicular to the longitudinal axis of said inlet tube; and
    means for detachably connecting said inlet tube at its other end to said inlet of said motor-fan unit, said inlet tube tapering from said first opening to said other opening throughout substantially the entire length of said inlet tube.

2. The vacuum system of claim 1, further comprising:
    a dual-porosity debris-collection bag connected at said outlet of said motor-fan unit for collecting debris entrained in the exhausted air, said debris-collection bag having a loop for suspending said bag from the shoulder an operator, said dual-porosity bag having a first surface area of a fabric having a first air flow porosity and at least one second surface area of a fabric having a second air flow porosity, the second air flow porosity being higher than the first air flow porosity.

3. The vacuum system of claim 2, wherein the second porosity is at least one and one-half times greater than the first porosity.

4. The vacuum system of claim 1, wherein:
a portion of said inlet tube proximate said first opening is cylindrical.

5. The vacuum system of claim 4 wherein:
said inlet tube further comprises a first section and a second section joined together by a telescoped coupling.

6. The vacuum system of claim 5, wherein:
said coupling comprises a bayonet-type coupling.

7. The vacuum system of claim 1, wherein:
said inlet tube is conically tapered between said one and other end.

8. The vacuum system of claim 7, wherein:
said inlet tube tapered at an angle of between two and three degrees with respect to the longitudinal axis of said inlet tube.

9. The vacuum system of claim 7, wherein:
said inlet tube has a length of approximately 30 inches.

10. The vacuum system of claim 7, wherein:
said first opening is circular and has a diameter of approximately six inches.

11. The vacuum system of claim 7, wherein:
said other opening is circular and has a diameter of approximately 4.25 inches.

12. A vacuum system for collecting and passing airborne debris comprising:
a motor-fan unit having a fan rotatably mounted in a fan scroll for drawing air from an inlet to said scroll and for exhausting the air to an outlet of said scroll, said fan described by a plurality of blades each having at least a linearly extending inner edge and a curvilinearly extending outer edge extending from said linearly extending inner edge to the periphery of said fan, said linearly extending edge thereof defining a conical surface of revolution along an axis of revolution of said fan, said conical surface being inclined at an angle of between 45 and 55 degrees with respect to said axis of rotation, said conical surface of revolution positioned oppositely with respect to said inlet for accepting and passing debris entrained in the air flow between said inlet and outlet, said curvilinearly extending surface defining an outwardly facing concave surface of revolution.

13. The vacuum system of claim 12, wherein said curvilinearly extending edges are closely spaced with respect to said fan scroll, said curvilinearly extending edges an spaced scroll portion being complimentarily inclined so as to enable free passage of debris therebetween.

14. The vacuum system of claim 13, wherein there are five blades.

15. The vacuum system of claim 14, wherein said fan is circular in plan view and has a diameter of approximately 4.5 inches.

16. A portable vacuum system for conveyance on the person of an operator comprising:
a motor-fan unit having a fan rotatably mounted in a fan scroll for drawing air from an inlet and for exhausting air to an outlet; and
a dual-porosity debris-collection bag having a debris inlet connected to said outlet of said motor-fan unit and having a carrying loop for suspending said bag from the shoulder of an operator for collecting debris entained in the exhausted air, said dual-porosity bag having a first surface area of a fabric having a first air flow porosity and at least one second surface area of a fabric having a second air flow porosity, the second air flow porosity being higher than the first air flow porosity and said second surface area positioned on said bag on the side thereof opposite from said debris inlet.

17. The vacuum system of claim 16 wherein the second porosity is at least one and one-half times greater than the first porosity.

* * * * *